(12) United States Patent
Agrawal et al.

(10) Patent No.: US 7,773,976 B2
(45) Date of Patent: Aug. 10, 2010

(54) SPAM CONTROL FOR SHARING CONTENT ON MOBILE DEVICES

(75) Inventors: Anuraag Agrawal, Bellevue, WA (US); Bryan Sullivan, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 436 days.

(21) Appl. No.: 11/852,501

(22) Filed: Sep. 10, 2007

(65) Prior Publication Data

US 2008/0003990 A1 Jan. 3, 2008

Related U.S. Application Data

(63) Continuation of application No. 10/822,187, filed on Apr. 9, 2004, now Pat. No. 7,295,833.

(51) Int. Cl.
*H04L 29/06* (2006.01)
(52) U.S. Cl. ................. 455/414.3; 455/414.1; 455/410; 455/411; 455/415; 455/420
(58) Field of Classification Search .............. 455/414.3, 455/414.1, 410, 411, 415, 419, 420
See application file for complete search history.

(56) References Cited

U.S. PATENT DOCUMENTS

| 5,956,636 | A | 9/1999 | Lipsit |
| 6,591,118 | B1 | 7/2003 | Han |
| 6,826,598 | B1 | 11/2004 | Titmuss et al. |
| 6,879,838 | B2 | 4/2005 | Rankin et al. |
| 2002/0155844 | A1 | 10/2002 | Rankin et al. |
| 2003/0123465 | A1 | 7/2003 | Donahue et al. |
| 2004/0203673 | A1 | 10/2004 | Seligmann |
| 2004/0205330 | A1 | 10/2004 | Godfrey et al. |
| 2005/0226166 | A1 | 10/2005 | Agrawal et al. |
| 2005/0266835 | A1 | 12/2005 | Agrawal et al. |

OTHER PUBLICATIONS http://searchportal.information.com/index.mas?epl=00540000UVsPWVALXVUMVV8U, wirelesscarrier.net "What you need, when you need it," downloaded from the internet on Nov. 14, 2006, 1 page.
http://www.coolgame.com/coolgame.wml, "Your best coolgame resource here," downloaded from the internet on Nov. 14, 2006, 2 pages.

*Primary Examiner*—Joseph H Feild
*Assistant Examiner*—Huy D Nguyen
(74) *Attorney, Agent, or Firm*—Woodcock Washburn LLP

(57) ABSTRACT

Sharing content among users of mobile devices is facilitated and controlled by a system and method that employs a content sharing application to receive and process requests to share content among users of devices such as mobile devices and personal computers. Recipients receive share content messages from the content sharing application indicating that they have been selected to access shared content. Such messages may provide direct or indirect access to the shared content via the recipient mobile device. Recipients can specify privacy management schemes to limit or control the receipt of such messages. The content sharing application may also provide various spam filtering techniques that prevent users from abusing the system, including restricting the number or type of requests to share content that may be effectuated over time.

11 Claims, 12 Drawing Sheets

SPAM CONTROL FOR SHARING CONTENT ON MOBILE DEVICES

CROSS-REFERENCE TO RELATED APPLICATIONS

This application is a continuation of U.S. patent application Ser. No. 10/822,187, filed Apr. 9, 2004, entitled "Spam Control for Sharing Content on Mobile Devices," which is herein incorporated by reference in its entirety.

This application is related to the following commonly assigned U.S. patent applications: U.S. patent application Ser. No. 10/821,608, filed Apr. 9, 2004, entitled "Sharing Content on Mobile Devices" and U.S. patent application Ser. No. 10/821,325, filed Apr. 9, 2004, entitled "Managing Differences in User Devices When Sharing Content on Mobile Devices," both herein incorporated by reference.

BACKGROUND

Content providers are increasingly offering content to subscribers of mobile wireless services. For example, mobile wireless service providers and others are offering wireless portals through which users of mobile devices can access content such as news, entertainment, and email services—the possibilities for content are endless. In addition, content providers that in the past have tailored their content for users of traditional web browsers are increasingly providing alternative formats for users of mobile devices.

The mobile devices of today, while much advanced, are typically small with limited input capabilities and navigation capabilities. For this reason, content intended for users of such devices is sometimes subject to special formatting and protocols. Another problem content providers struggle with is marketing their content to users of mobile devices. For example, because of the limited input/output capabilities of most wireless devices, it is difficult for the mobile end user to search for and identify new and interesting content. Very often, the best applications or content is made known by "word of mouth." For example, a friend or colleague may recommend a particular mobile application. In doing so, he or she has to remember and describe where the content was found, which may not always be easy or practical.

Another complication involves controlling the spread of unwanted or undesirable content that is propagated to a user's device, especially where users of mobile devices may be using valuable minutes or data allowances to view such unwanted content. Messages directing a user to view unwanted content are sometimes referred to as spam, and are typically sent for the purpose of marketing, other personal gain, or even harassment.

Figure 1:
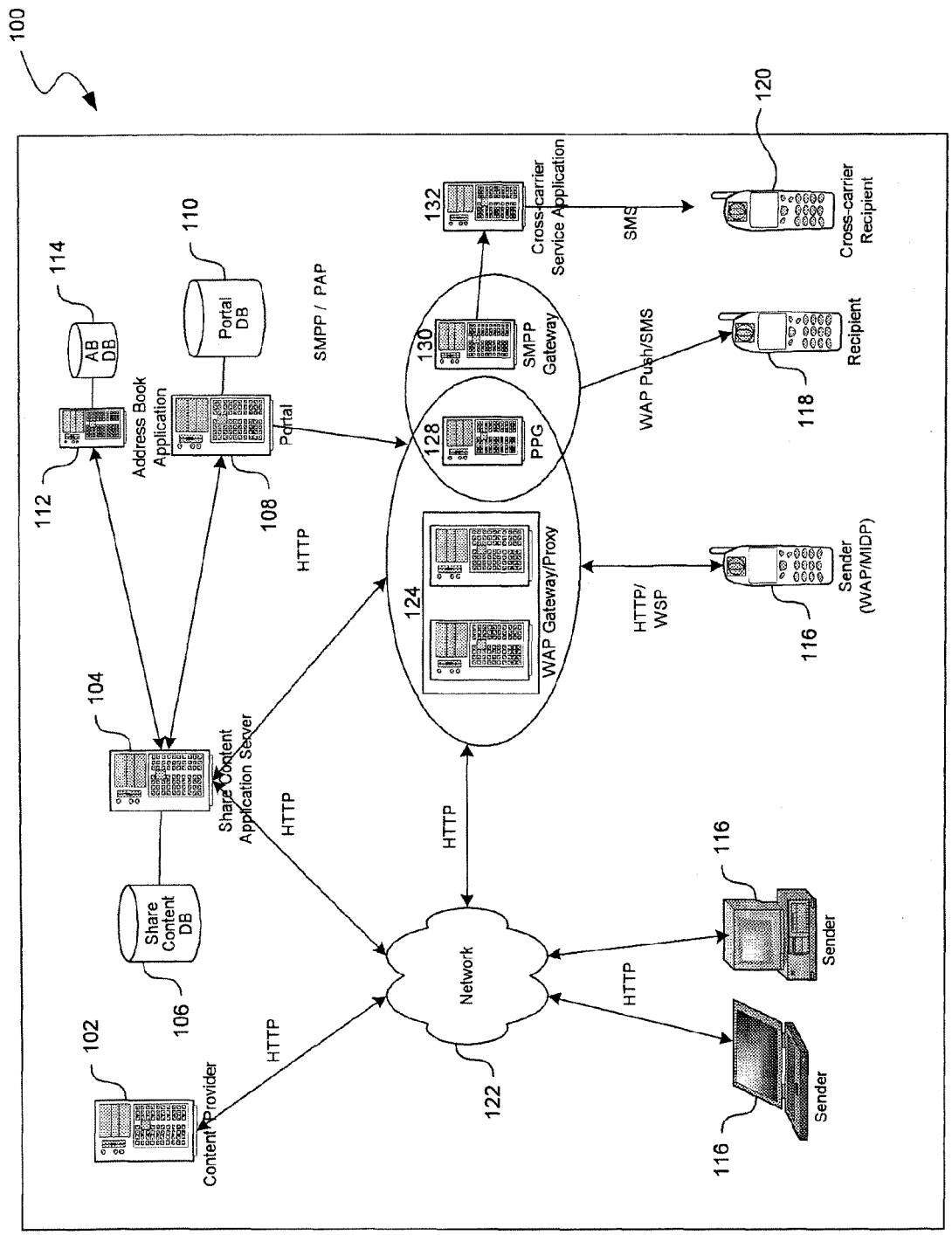
FIG. 1 is a block diagram showing an example of a system for sharing content under one embodiment.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the U.S. Patent and Trademark Office's patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions are not shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

The method and system described herein allows users of mobile devices to share content with other users via mobile messaging and other similar techniques, while at the same time minimizing the sending and receiving of unwanted share content messages (e.g., spam). In general, and as described more completely in U.S. patent application Ser. No. 10/821, 608 (incorporated herein by reference), the content sharing application makes sharing content easy for both users and content providers and helps to overcome difficulties associated with the limited input capabilities of small devices. For example, a user of a mobile device finds interesting content and wants to send it to a friend. The user then selects a share content link on the content page, which is provided by the content provider, who created the share content link based on an application program interface (API). The request to share content is sent to a share content application, which then sends a recipient identification form to the user's device. The user identifies the friend (or friends) by filling out and submitting the recipient identification form. The user's friend (or friends) then receives a content link via a message or alert (e.g., a WAP push message). The friend can then choose to act upon the received message by loading a URL provided in the message, or can ignore it or delete it.

In addition to the capabilities referenced above, the share content application may include safeguards to help prevent the circulation of unwanted share content messages. For example, if a user attempts to send content to a large number of recipients in a short period of time (e.g., in a mass marketing attempt), the user may be blocked from doing so. In addition, each recipient may set up privacy control features to prevent the receipt of unwanted messages.

In some embodiments, receipt of unwanted messages can be avoided by hosting the content sharing application, at least in part, on mobile service provider servers configured for IP filtering. Such filtering restricts a user's access to the content sharing application unless the user is attempting to access the content sharing application from a mobile service provider's own WAP gateways (e.g., via a registered mobile device). When access is blocked in this way, selecting a content providers share content link may not result in the user receiving a recipient information form from the share content application. This configuration generally prevents access by spam-generating users that do not have registered mobile devices, yet still allows legitimate users to access the share content application from a device other than the registered mobile phone by taking certain steps to get past the IP filtering. For example, the system may allow access from a PC or laptop if the user first establishes a network connection via a GPRS modem that is connected into the service provider network (which can then be tethered with a laptop, etc.). Each time a share content request is sent to the share content application, the share content application checks an ID of the user and verifies the user as a service provider subscriber before generating and sending the share content message to the recipient.

Regardless of whether the above-described filtering technique is implemented, the share content application can implement additional techniques to prevent the sending of unwanted share content messages. For example, the content sharing application may limit the number of recipients a user can specify using a single recipient information form (e.g., three-recipient maximum).

For users attempting to share content via an HTTP session (e.g., on a PC or laptop) the share content application may add a session variable in the HTTP session when the user requests to share content. More specifically, after the share content application receives the user's request to share content (e.g., by selecting a share content link), the share content application may generate the session variable (with a time stamp) in association with generating and sending a recipient information form. The user device sends the session variable back to the share content application after the user has filled in and submitted the recipient information form. Before it generates or sends out a share content message to the recipient, the share content application checks the value of the session variable (and time stamp) and compares it with a user history to ensure that the same user has not exceeded a threshold level of share content requests within a given time frame. This prevents malicious use of scripts that repeatedly request to share content (e.g., by repeatedly selecting the form submission button).

Another technique that limits the ability of more sophisticated spammers to share unwanted content (e.g. by writing scripts) involves providing a code (e.g., a sequence of numbers and letters) on the recipient information request forms. The form then requests that the user enter that code on a field in the recipient information request form. Because a script cannot read the code, this ensures that a user is entering the actual form and not a script.

Yet another technique to prevent the receipt of unwanted share content messages includes providing an option for recipients to opt in or out of receiving share content messages from particular users (or all users). Such techniques may involve the use of global privacy settings and/or privacy lists (e.g., blocked sender list, allowed sender list, etc.). Thus, privacy management for the recipients can be global or user-specific. For example, John can opt out of receiving these alerts from all or any users, while Jill may want to receive such alerts only from a few of her friends, whereas Jack blocks only a select list of users for sending such alerts.

II. Representative System

FIG. 1 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like. Indeed, the terms "computer," "host," and "host computer" are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, such as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a system 100 on which the content sharing scheme can be implemented provides various networked components. These components include one or more content providers 102, a share content application 104 and database 106, a wireless portal 108 and database 110, and, optionally, an address book application 112 and database 114. The system 100 also includes various end user components, including content sender devices 116 (e.g., mobile device, laptop, PC, etc., with browser), content recipient devices 118 (e.g., WAP-enabled mobile device, SMS-enabled mobile device, etc.), and cross-carrier recipient devices 120. Details regarding the functionality of the components of FIG. 1 are described in detail below.

These various components communicate via one or more networks 122. For example, the system 100 may include a wireless network. Examples of wireless telecommunication networks include UMTS (universal mobile telecommunication system), GSM (global system for mobile communications) (possibly including GPRS (general packet radio service), EDGE (enhanced data rates for GSM evolution), etc.), CDMA (code division multiple access), IS-136, analog, etc. The system may also include various wired or partially wired networks, such as the Internet, a wired LAN (local area network), or even a public switched telephone network (PSTN). While not all types of networks are described herein, the invention may be implemented within the framework of many types of networks.

In some embodiments, the share content application 104, along with the various gateway components, is configured to communicate within more than one of the above described communication networks. For example, users may access the share content application 104 from a personal computer or laptop via a wired or partially wired public communication network (i.e., the Internet). It can also be accessed via a telecommunication network, such as one of the wireless or wired networks described above.

To facilitate and manage network communications, the system 100 may include various communication gateways and related applications. For example, the share content application 104 and the content sender devices 116 communicate via a WAP gateway/proxy 124, and a push proxy gateway 128. Content recipient devices 118 may receive WAP push messages via the push proxy gateway 128 and a short message peer-to-peer gateway 130. Cross-carrier content recipient devices 120 may receive messages via a short message peer-to-peer gateway 130 used in conjunction with a cross-carrier service application 132. In general, any "cross-carrier" component refers to a component operated by a telecommunications carrier that differs from a telecommunications carrier operating the other components of FIG. 1.

Via this combination of networks and gateways, the share content application 104 may establish communication links on many different types of networks, with many different types of devices, including cross-carrier devices. In some embodiments, the share content application 104 runs on, or in association with, the system of a wireless service provider or wireless carrier. Accordingly, many of its capabilities may be based on information associated with its subscribers (customers). Some of these capabilities include tracking share content requests made by users.

Figure 2:
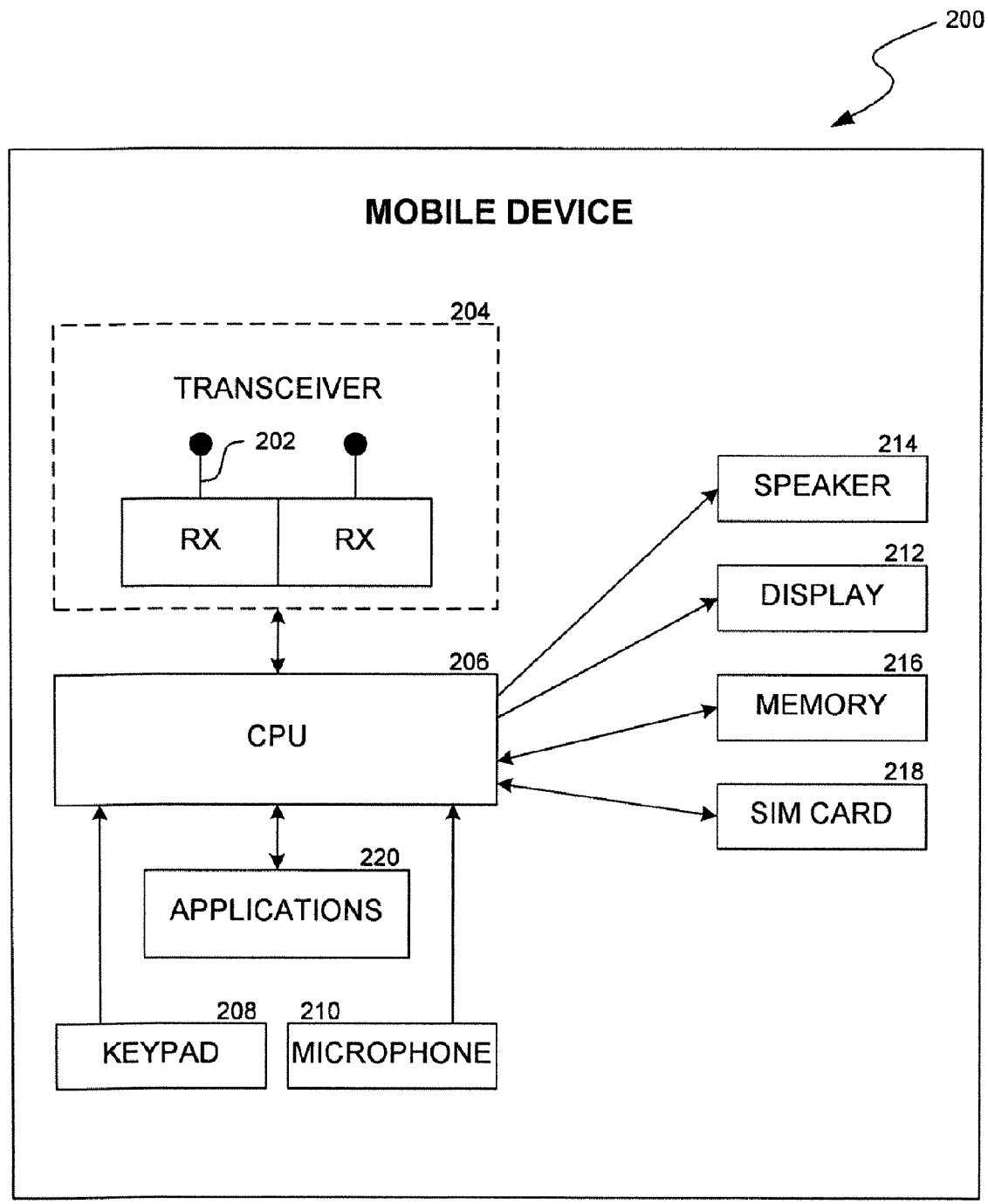
FIG. 2 is a block diagram showing an example implementation of the mobile devices of FIG. 1.

FIG. 2 shows a block diagram of a typical mobile communication device 200, such as a mobile handset. This device is representative of both the content sender device 116 and content recipient devices (118 and 120) of FIG. 1. While a mobile phone is shown as the mobile communication device in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile device 200 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A customer may provide input to the processor unit 206 via a keypad 208, microphone 210, or display/touchpad 212. In turn, the processor unit 206 may provide information to the customer via the display/touchpad 212 or a speaker 214.

The processor unit 206 may access information from, and store information in, a nonremovable memory 216 or a removable memory 218. The nonremovable memory 216 may consist of RAM, ROM, a hard disk, or other well-known memory storage technologies. The removable memory 218 may consist of Subscriber Identity Module (SIM) cards, which are well known in GSM communication systems, or other well-known memory storage technologies, such as "smart cards." Applications 220 such as wireless content browser applications and address book applications could be implemented in either the removable memory 218 or the nonremovable memory 216.

III. Application Program Interface and Platforms

In some embodiments, the share content application may be associated with an API (application program interface) that allows content providers to easily create "links" or other functionality that facilitates sharing of content and applications. In some embodiments, share links may be placed within the content itself, or be somehow otherwise available through the content or application. Such links may be in the form of an HTTP GET request, which may use the URL itself to send information (e.g., application name, application URL, return URL, etc.) to the share content application. An example of such a request is as follows:

http://wireless.mobile.wirelesscarrier.net/
p2p?msisdn=2065551212&app_name=CoolGame&
app_url=http://www.coolgame.com/
coolgame.wml&return_url=http://www.coolgame.com In the above example, the URL begins with an indication of the protocol in use ("http") followed by the host name "wireless.mobile.wirelesscarrier.net" followed by the "p2p" path name. The information provided following the "?" is the information sent as part of the GET request. In the above example, this information includes the MSISDN of the content sender device (2065551212) and the application name (name for the content, "Cool Game"), the application URL (www.coolgame.com/coolgame.wml), and a return URL (www.coolgame.com). The application URL takes the friend or recipient to content upon receipt of the message, while the return URL takes the user back to the content after the share content request process is complete. The application URL and the return URL may be the same or different. For example, if a content provider wants to route all new visitors to a home page, the application URL may be the home page, whereas the return URL may be the page from which the user selected the share content link. In the above example, the information passed in the GET request may be configured statically, with only the MSISDN added at run time. Depending on the technique used for sharing the information, other information can be added to the GET request at run time, such as the sender's name/message, the friend's MSISDN, etc. Some of the parameters that can be passed in a GET request are described in more detail in Table 1 below.

TABLE 1

| Parameter | Description |
| --- | --- |
| url | The URL of the content that is being shared. This is also the generic URL in case the surl is specified. In some embodiments, this parameter is needed when surl is not specified. |
| surl | The specific URL of the content that is being shared. The friend receives the surl in the push message when the friend's device belongs to the user's device class. If this parameter is not specified irrespective of the device of recipient, url is shared. |
| title | Title of the content to be shared |
| returnurl | The URL to which the sender is returned after the user is done sharing the content. When returnurl is not specified, surl is used. When surl and returnurl are not specified, the value of url is used to return the user. |
| cc | Indicates whether the content provider is interested in sending the SMS message to a cross-carrier friend of the user. If this value is set to "y" an SMS message is sent to cross-carrier friends with the value for url in the message. A missing cc parameter or any other value other than "y" would mean this URL will not be shared with the cross-carrier friend. |

IV. System Flows

Figure 3:
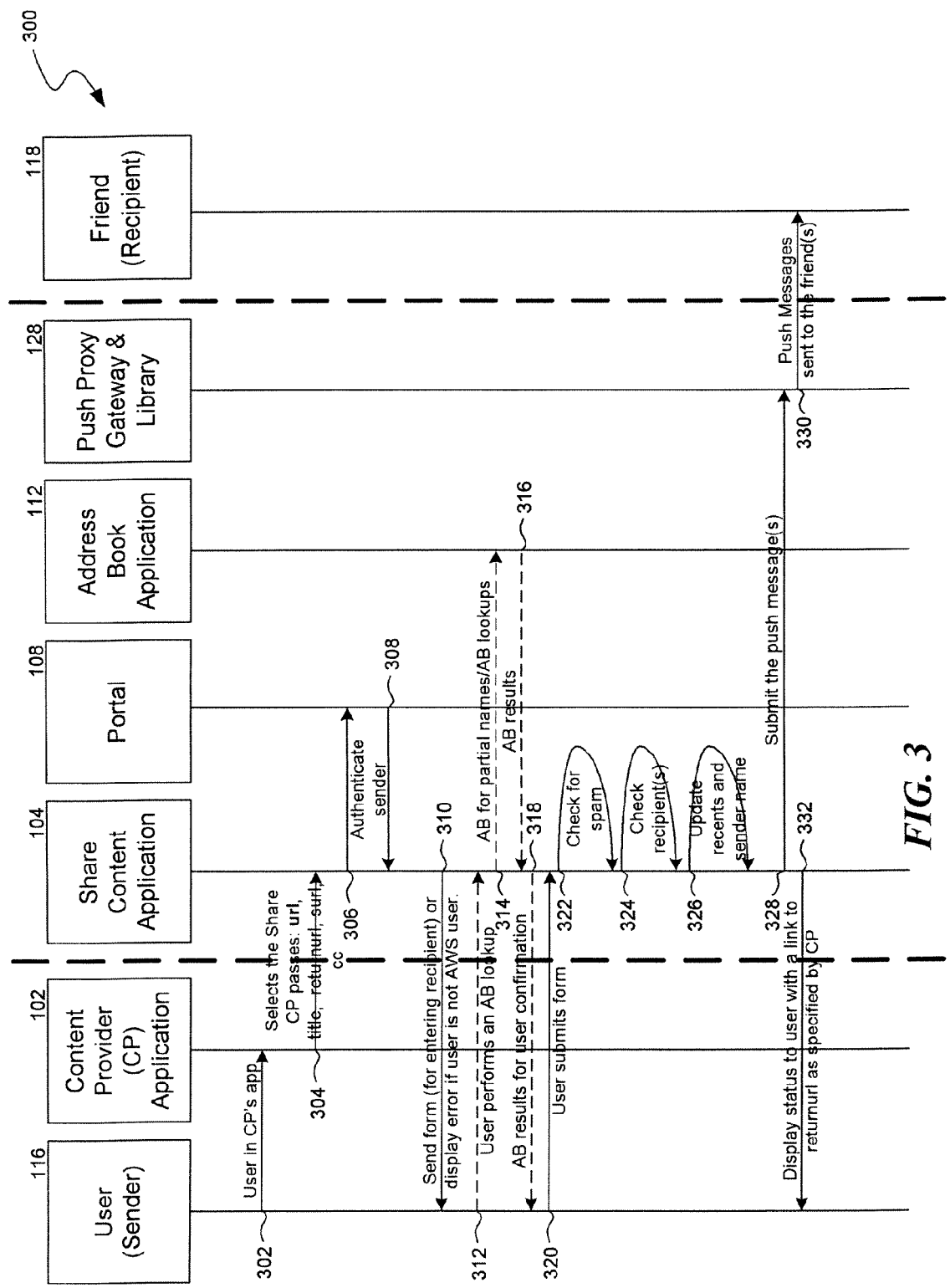
FIG. 3 is a flow diagram showing a high-level transaction flow between various components of the system of FIG. 1.
Figure 4:
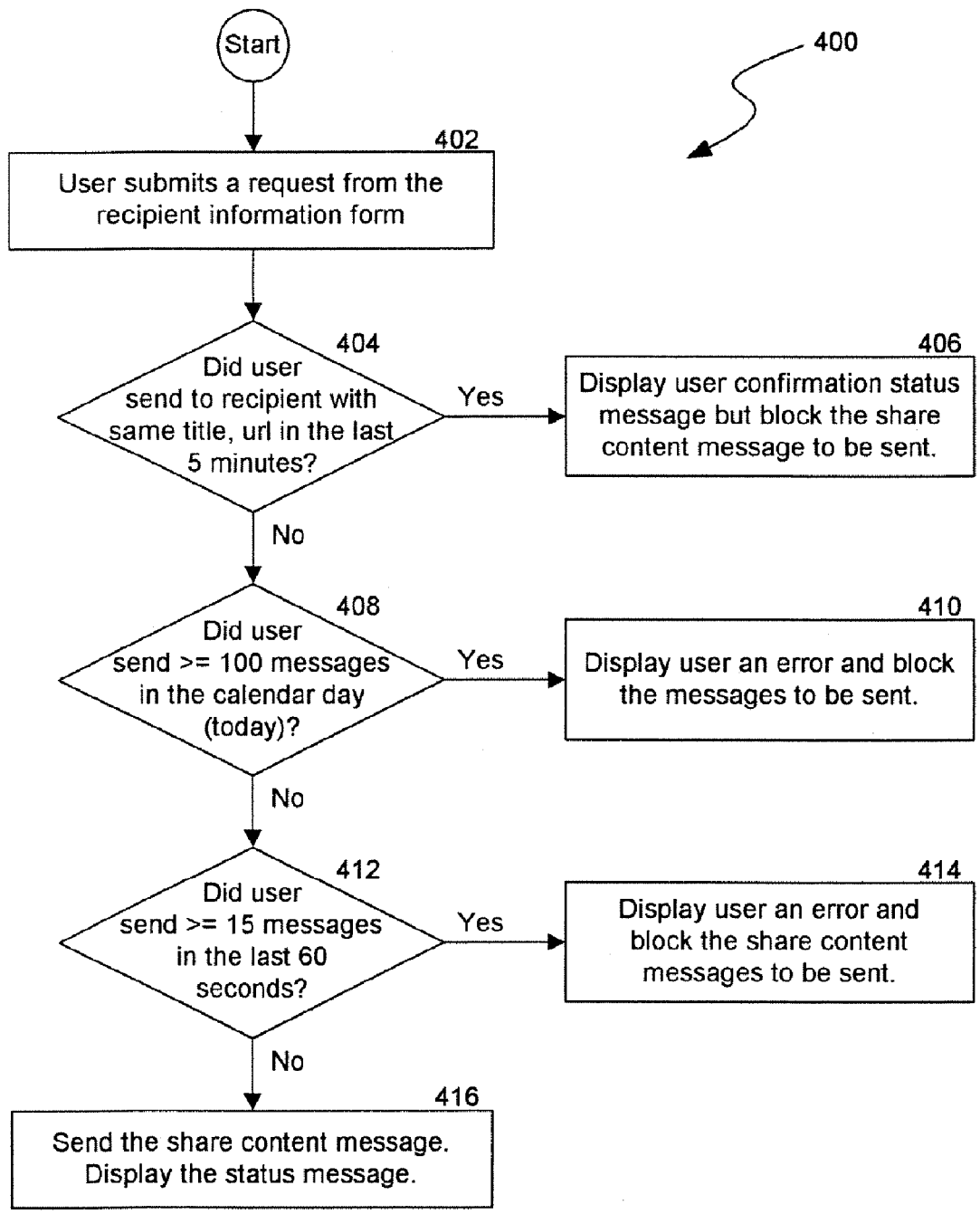
FIG. 4 is a flow diagram showing an example of a spam filtering routine performed by the share content application of FIG. 1.
Figure 5:
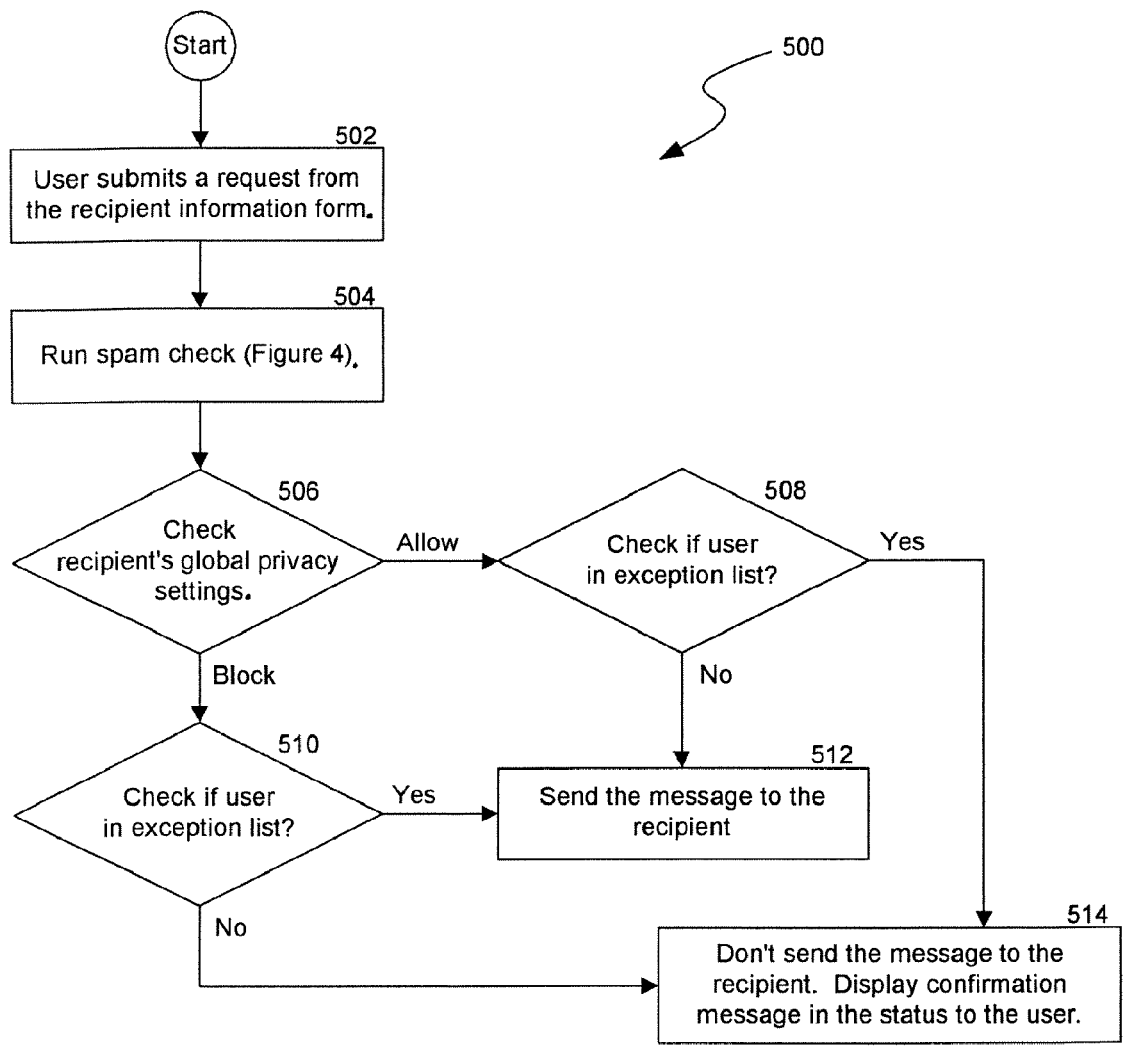
FIG. 5 is a flow diagram showing a privacy management routine performed by the share content application of FIG. 1.

FIGS. 3 through 5 are representative flow diagrams that show processes that occur within the system of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

The flows represented in FIGS. 3 and 4 are high-level flows in which the entire transaction is shown from initiation to completion. Some of the individual processes or subtransactions are described in more detail in the Figures that follow. The various entities that may be involved in the transaction are also depicted in FIG. 1 and include the content sender device 116, the content provider 102, the share content application 104, the wireless portal 108, the address book application 112, various components of the push proxy gateway 128, and the content recipient device 118.

Referring to FIG. 3, a share content transaction 300 for WAP-enabled devices is shown from initiation to completion. At a subtransaction 302 a user of the content sender device 116 selects to share content provided by the content provider 102. At a subtransaction 304 the share content application 104 receives various parameters associated with the content to be shared. The types of information that may be included as parameters are described in more detail above in the section entitled "Application Program Interface and Platforms." In some embodiments, the parameters are sent in the form of an HTTP GET request that is created by the content provider 102 and accessed by the user of the content sender device 116 as a hyperlink on a content page. At a subtransaction 306, the share content application 104 receives the share content request and authenticates the user of the content sender device 116. In the case where users are selecting to share content from a PC, the portal may provide the appropriate user information so that the share content application 104 can perform this verification subtransaction.

Once the user is authenticated, at a subtransaction 310, the content sender device 116 receives a user input form from the share content application 104. If authentication of the user fails, the user sees an error message on the device instead of the user input form. The user may also see this error message if the content provider 102 fails to provide certain parameters (e.g., url or surl, described below).

At a subtransaction 312, the user performs an optional address book lookup function via the share content application 104. At a subtransaction 314, the share content application 104 may optionally invoke the address book application 112, which, at a subtransaction 316, performs a query of the address book (AB) database 114 and provides results to the share content application 104. At a subtransaction 318, the share content application 104 sends results of the address book lookup to the content sender device so it can be displayed to the user and the user can select or enter the appropriate entries.

After the user has completed the input form, at a subtransaction 320, the content sender device 116 submits the completed form to the share content application 104. At a subtransaction 322, the share content application 104 may check for spam, a process that is described in more detail in FIGS. 4-12, which are described in more detail below. At a subtransaction 324, the share content application 104 checks the recipient status to determine whether each specified content recipient device 118 subscribes to a service associated with the share content application 104 or is a cross-carrier recipient. At this transaction, the share content application 104 may also check for information about the recipient devices to determine whether they may be compatible with the content or applications to be shared, a process that is described in more detail in U.S. patent application Ser. No. 10/821,325 (incorporated by reference).

At a subtransaction 326, a "recents" list may be updated with the latest recipient information. This list may be stored at the share content application 104 and may include a list of names or MSISDNs (mobile station ISDN number) most recently contacted by the user.

At a subtransaction 328, the share content application 104 communicates with various components of the push proxy gateway 128 to establish a WAP push message for each of the eligible content recipient devices 118. In some embodiments, a single push proxy gateway address will resolve users on all available gateways available in the network. At a subtransaction 330, the WAP push message(s) are sent to the content recipient device(s) 118. In this way, the user of a content recipient device 118 is directed to the content (e.g., a URL). At a subtransaction 332, the share content application 104 sends a status page to the content sender device 116. This may include return URL information so that the user can automatically be taken back to the content that he or she originally selected for sharing.

Figure 6:
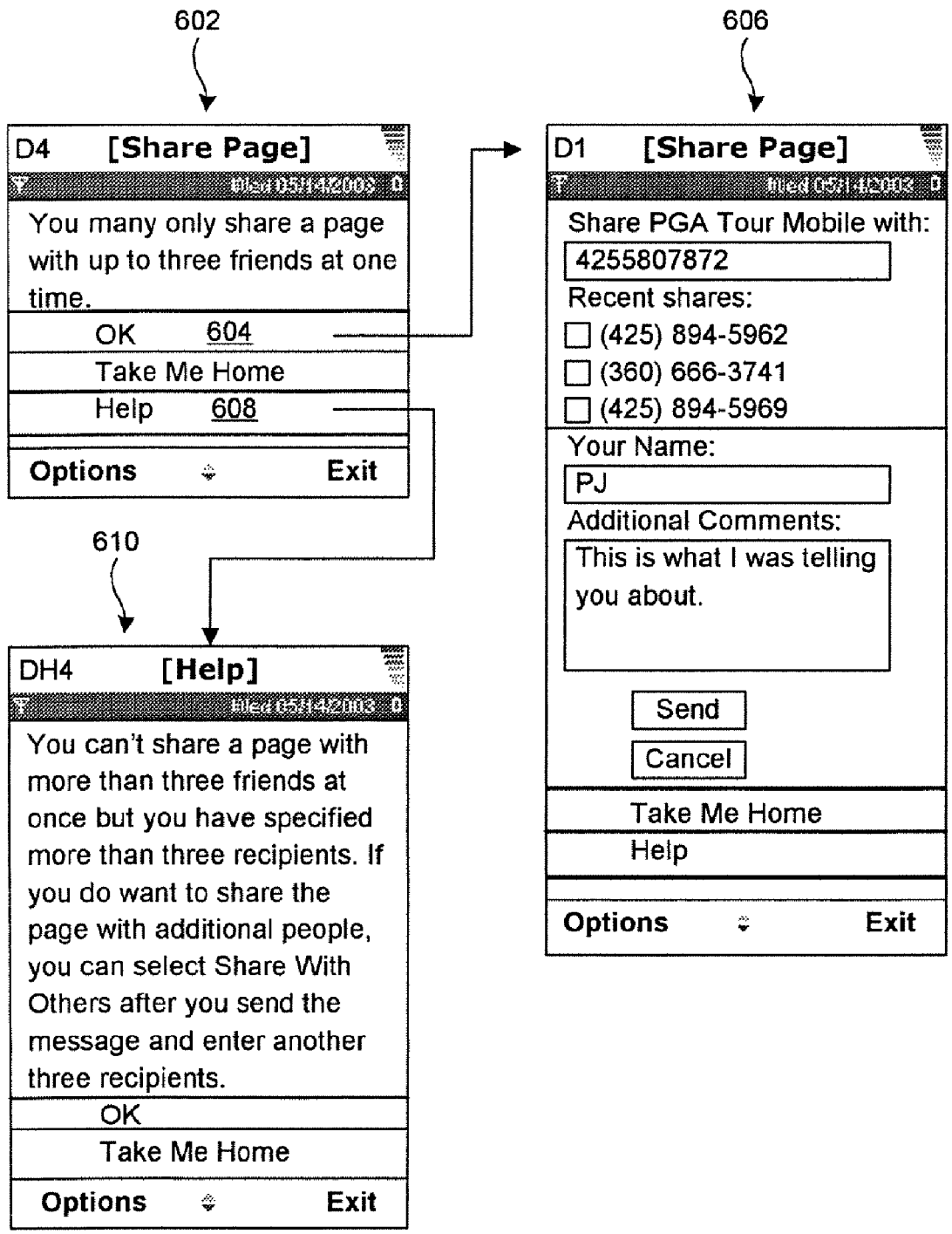
FIG. 6 is a display diagram showing screens from which a user of the mobile content sender device of FIG. 1 can view spam control messages when the user has attempted to share content with more than three users at one time.
Figure 8:
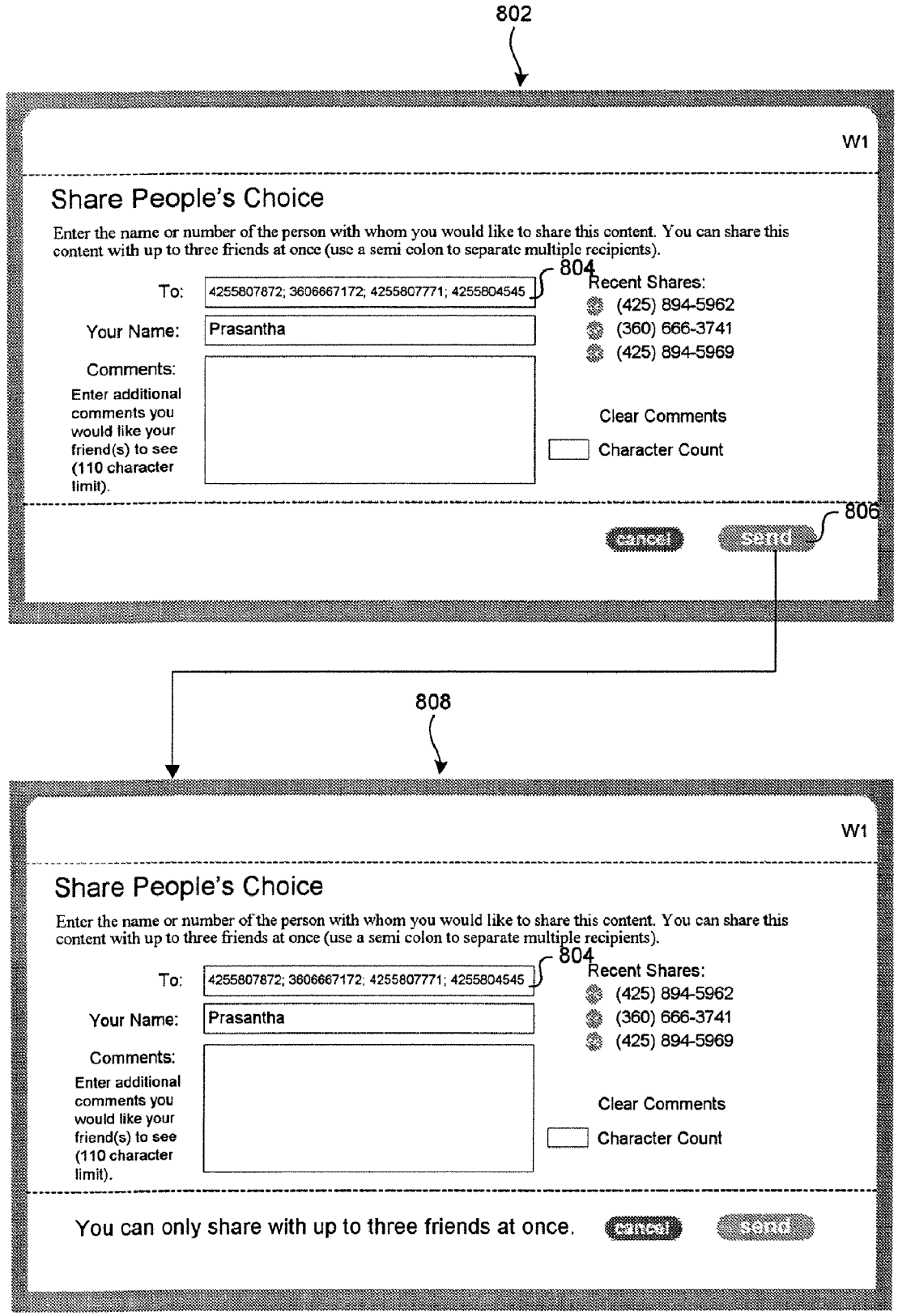
FIG. 8 is a display diagram showing screens from which a user of the personal computer content sender device of FIG. 1 can view spam control messages sent when the user has attempted to share content with more than three users at one time.

Referring to FIG. 4, a call flow for a routine 400 implemented at the share content application controls spam, while still allowing users to access the share content application from a device other than a registered mobile device (e.g., an Internet-enabled PC with a standard web browser). At block 402 the user submits a recipient information form received after the user selected a link on a content provider application or page. The recipient information form is configured to allow the user to identify recipients to receive selected content. When filled in by the user, the recipient information form includes information identifying one or more recipients. Alternatively, the form may come pre-filled-in and may contain a list of "recent" recipients identified by the user in previous recipient information forms. In some embodiments, the recipient information form may limit the number of recipients that the user can identify using the single form. In some embodiments, the recipient information form itself may not limit the number of recipients. Instead, the routine 400 performs a check after the user submits the form to make sure a threshold limit of recipients is not exceeded (e.g., three recipients per form), as illustrated in FIGS. 6 and 8.

At decision block 404, the routine 400 checks whether, within a given short time frame (e.g., five minutes), the same user submitted a recipient information form associated with the same content (e.g., content having the same title or URL parameters). The routine 400 may use a time-stamped session variable generated in association with the recipient information form to implement this check. For example, the user device may send the session variable back to the share content application after the user has filled in and submitted the recipient information form. The routine 400 checks the value of the session variable (and time stamp) and compares it with a user history to ensure that the same user has not exceeded the threshold level of share content requests. If at decision block 404 the routine 400 identifies that the user submitted a request for sharing the same content in the given time frame, the routine continues at block 406 where it blocks the share content message to be sent to the recipient. In some embodiments, at block 406, the routine 400 also sends a confirmation or success message to the user under the assumption that, in light of the given conditions (short time period/same content), the user is indeed sending spam. Because the user does not know that the spam messages are not reaching the recipients, the user will not be encouraged to employ additional measures to send the messages. If, however, at decision block 404 the routine 400 identifies that the user did not send a similar request within the given time frame, the routine continues at decision block 408.

At decision block 408, the routine 400 checks if the user sent more than a threshold number (e.g., 100) of share content messages within a given time frame (e.g., one calendar day). In general, this check detects if the user is using an automated script to generate the share content messages. If at decision block 408 the user exceeded the threshold number of messages in the given time frame, the routine 400 continues at block 410 where it blocks the share content message to be sent to the recipient, and sends an error message to the user. If, however, at decision block 408 the user did not exceed the threshold number of messages to be sent in the given time frame, the routine 400 continues at decision block 412.

At decision block 412, the routine 400 checks if the user sent more than a threshold number (e.g., 15) of share content messages within the given short time frame (e.g., 60 seconds). If at decision block 412 the routine 400 identifies that the user did exceed the threshold number of share content messages during the given time frame, the routine continues at block 414 where it blocks the share content message to be sent to the recipient and sends an error message to the user. If, however, at decision block 412, the routine 400 identifies that the user did not send a similar request within the given time frame, the routine continues at decision block 416, where it generates the share content message and the user receives confirmation that the message was sent.

The spam control thresholds that the share content application uses in making its spam checks may be controlled by configuration parameters set by system administrators, or even automatically (e.g., thresholds may change at certain times of day, assuming that most legitimate users will operate during waking hours, etc.).

The share content application may use a data table to keep track of messages initiated by the user. For each share content message initiated by the user, the data table may track a submission number, a recipient identifier MSISDN (e.g., a sent date, a content title, and a content URL value). The table may have a purging mechanism, which clears the data table on a periodic basis (e.g., daily). In some embodiments, the time stamp information associated with a given recipient information form is checked against values in such tables. The data stored in the table may allow the application to calculate a "spam score" for the user for a given time period (e.g., one minute, 15 seconds, one day, etc.).

Regardless of whether spam control techniques such as those described above and others are implemented, some users may find it undesirable to receive share content messages or alerts, even from friends. Accordingly, the system may facilitate privacy management options (e.g., opt in/opt out) that recipients themselves can control. Referring to FIG. 5, the share content application may provide a privacy management framework and routine 500. At block 502, the user submits a recipient information form received after the user selected a link on a content provider application or page. The form is configured to allow the user to identify recipients to receive selected content. When filled in by the user, the recipient information form includes information identifying one or more recipients. Alternatively, the form may come pre-filled-in and may contain a list of "recent" recipients identified by the user in previous recipient information forms.

At block 504, the share content application performs one or more spam check routines, such as the spam check routine 400 of FIG. 4. At decision block 506 the routine 500 checks the recipient's global privacy settings. If at decision block 506 the recipient's global privacy settings generally allow for content sharing messages, the routine 500 allows the message to pass to the next check and proceeds to decision block 508 (check for negative exceptions). However, if at decision block 506 the recipient's global privacy settings generally do not allow for content sharing messages, the routine 500 blocks the message and continues at decision block 510 (check for affirmative exceptions).

At decision block 508, the routine 500 checks if there is a negative exception for receiving messages from the user initiating the share content message. This may include checking a "blocked list" created by the recipient to check if the user is included. Alternatively, the recipient may block certain types of content, rather than messages from particular users. If there is a negative exception associated with the user (or content), the routine 500 continues at block 514, where the routine does not send the message to the recipient. At block 514, the routine 500 may also send a status message to the device of the user (e.g., "message sent" or "message not sent"). Note that in some embodiments, the op-out preferences of a recipient are not revealed to the user, meaning that it will appear to the user that the recipient received the share content message, whereas in actuality it was blocked.

If at decision block 508 there is no negative exception associated with the user (or content), the routine 500 continues at block 512, where the share content application sends the message to the recipient.

From decision block 510, the routine 500 checks if there is an affirmative exception for receiving messages from the user (or for the particular content being sent. If at decision block 510 an affirmative exception exists, the routine continues at block 512 where the share content application sends the message to the recipient. However, if at decision block 508 the user initiating the message is not on the recipient's affirmative exception list, the routine continues at block 514 where the share content application does not send the message to the recipient and where the share content application sends a status message to the device of the user.

The share content application may collect a recipient's privacy settings, including global privacy settings, in a data table. For example, if a recipient's global privacy flag is set to a value of "0" or "false," then the recipient wants to receive share content messages. In contrast, if the global privacy flag is set to a value of "1" or "true," then the recipient does not want to receive share content messages. If no record is present for the recipient, then the default is to allow share content messages to be sent to recipient. The data table may also store information about identifiers (e.g., MSISDNs) associated with recipient devices, as well as identifiers associated with users or user devices. In this way, exceptions to the global or default settings can be implemented (e.g., as described with respect to blocks 506 to 514 of FIG. 5). Such techniques can be implemented even where users and recipients are not registered users of the service provider associated with the share content application.

The opt-in/opt-out privacy management approaches described above provide flexibility for users in managing their privacy preferences. However, one skilled in the art would understand that these and other privacy management techniques could be implemented without departing from the scope of the invention. For example, users may manage privacy by defining the types of content that they would or would not like to receive. Likewise, users may manage privacy by restricting content from certain content providers. In some embodiments a range of opt-in/opt-out options may be made available to users via a portal preferences screen or via other means.

V. User Interface

As described in the flow charts above, the content sharing system may include various user screens, views, and other interfaces that allow users to share content, view spam control limitations, and define privacy settings. Examples of such screens are described with respect to FIGS. 6 through 12. While only certain examples are given, a person skilled in the art will appreciate that many other interfaces could be implemented without departing from the scope of the invention. The terms "screen," "window," "web page," and "page" are generally used interchangeably herein. The pages described herein may be implemented using, for example, WML (wireless markup language), XHTML (extensible hypertext markup language), XML (extensible markup language), or HTML (hypertext markup language). In some embodiments, WML and XHTML decks offer similar functionality but may differ with respect to style guide and design requirements between the two languages (use of color, icons, etc.). The look and feel of WML pages are primarily text-based, with underlining used to highlight clickable links. XHTML is a richer development language, allowing the mobile device to present content that may stand out on many different levels. For example, XHTML may allow the use of front and background colors, bolding, and icons.

The screens or web pages provide facilities to receive input data, such as a form with fields to be filled in, pull-down menus, or entries allowing one or more of several options to be selected, buttons, sliders, hypertext links, or other known user interface tools for receiving user input. While certain ways of displaying information to users is shown and described with respect to certain Figures, those skilled in the relevant art will recognize that various other alternatives may be employed. The pages or screens are stored and/or transmitted as display descriptions, as graphical user interfaces, or by other methods of depicting information on a screen (whether personal computer, PDA, mobile telephone, or other) where the layout and information or content to be displayed on the page is stored in memory, a database, or other storage facility.

When implemented as web pages or wireless content, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

In general, for ease in describing features of the invention, aspects of the invention will now be described in terms of a user interacting with the share content application server computer via his or her user computer or mobile device. As implemented, however, the user computer receives data input by the user and transmits such input data to the server computer. The server computer then queries the database, retrieves requested pages, performs computations, and/or provides output data back to the user computer, typically for visual display to the user.

Referring to FIG. 6, when the user attempts to share content with more than three users at one time using a single form, the user may receive an error message, as displayed in an error message screen 602. The error message screen 602 specifies that the user may only share a page with up to three friends at one time. From the error message screen 602 the user can select an OK option 604, which results in the display of a recipient identification form screen 606. From the recipient identification form screen 606, the user may specify a new set of users or edit the original set. From the error screen 602, the user can also select a help option 608, which will take the user to a help screen 610 that specifies that the user may not share a page or content with more than three friends at once but has specified more than three recipients. The help screen 610 also specifies that if the user does not want to share the page with additional people, the user can select a "share with others" option (not shown) after sending the message, enabling the user to enter additional recipients.

Figure 7:
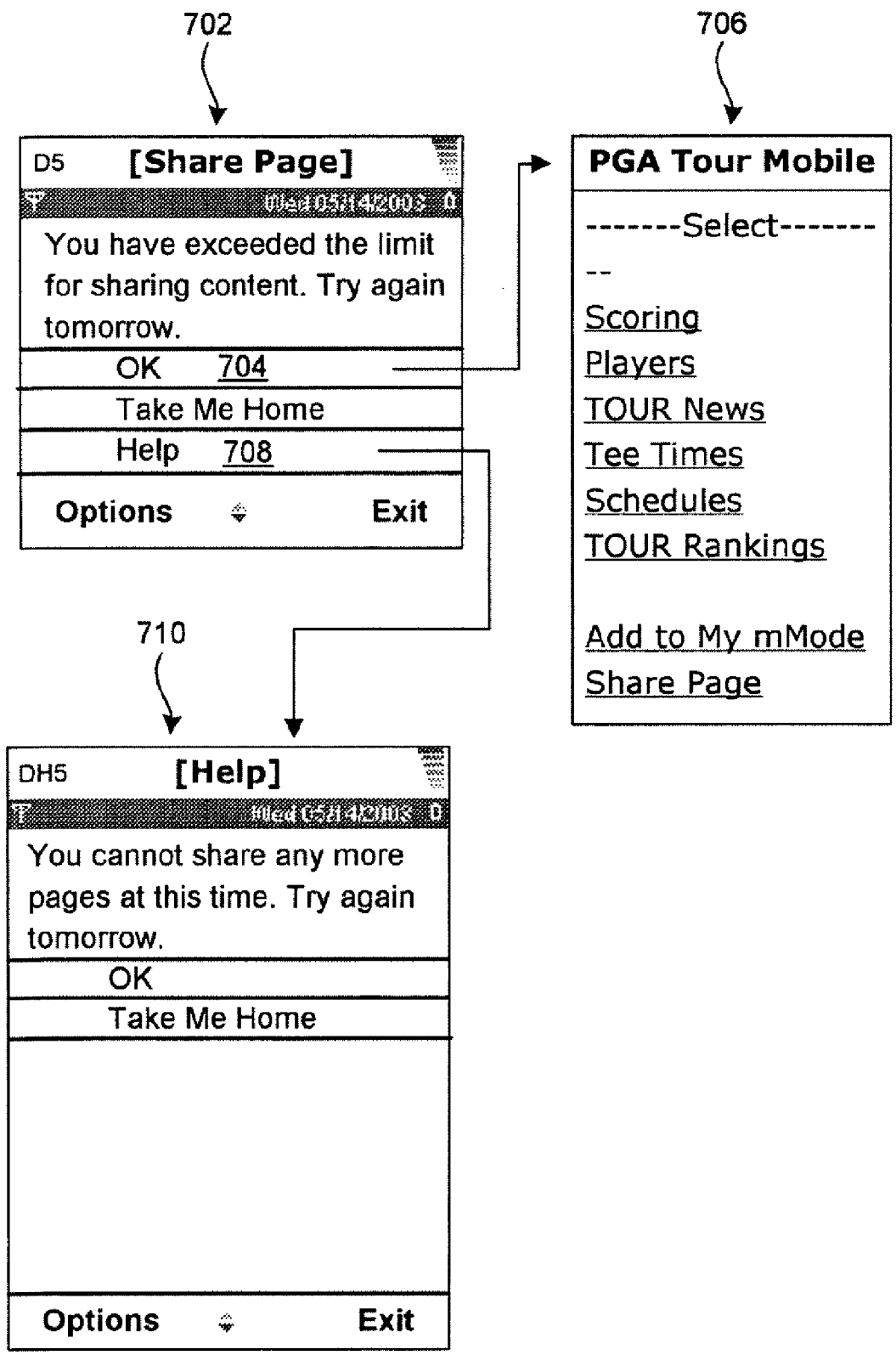
FIG. 7 is a display diagram showing screens from which a user of the mobile content sender device of FIG. 1 can view spam control messages sent when the user has attempted to exceed a threshold for sending content messages within a given time period.

Referring to FIG. 7, if the user exceeds a limit for sharing content within a specified time period, an error message screen 702 is displayed to the user. The error message screen 702 contains a message that the user has exceeded the limit for sharing content, and that the user may try again the next day. From the error message screen 702, the user can select an OK button 704, which takes the user back to a homepage screen 706. Alternatively, the user can select a help option 708, which then takes the user to a help screen 710 that specifies that the user cannot share any more pages at this time. The error message screen 702 is displayed when the user attempts to share spam or otherwise exceeds allotted thresholds. However, as noted above with respect to FIGS. 4 and 5, in some situations the share content application may intentionally fail to provide the error message screen in hopes that, if the user thinks the recipients are receiving the spam messages, the user will not take alternative measures.

Referring to FIG. 8, users of PCs or other devices may also receive error or status messages when attempting to send content. For example, as shown on a recipient information form screen 802, a user is attempting to send a message to more than three recipients by inputting more than three numbers into a text field 804. When the user selects the send button 806, an error screen 808 is displayed that specifies that the user can only share with up to three friends at once. From the error screen 808, the user can delete one or more of the phone numbers entered in the text field 804 so that the three phone number limit is not exceeded.

Figure 9:
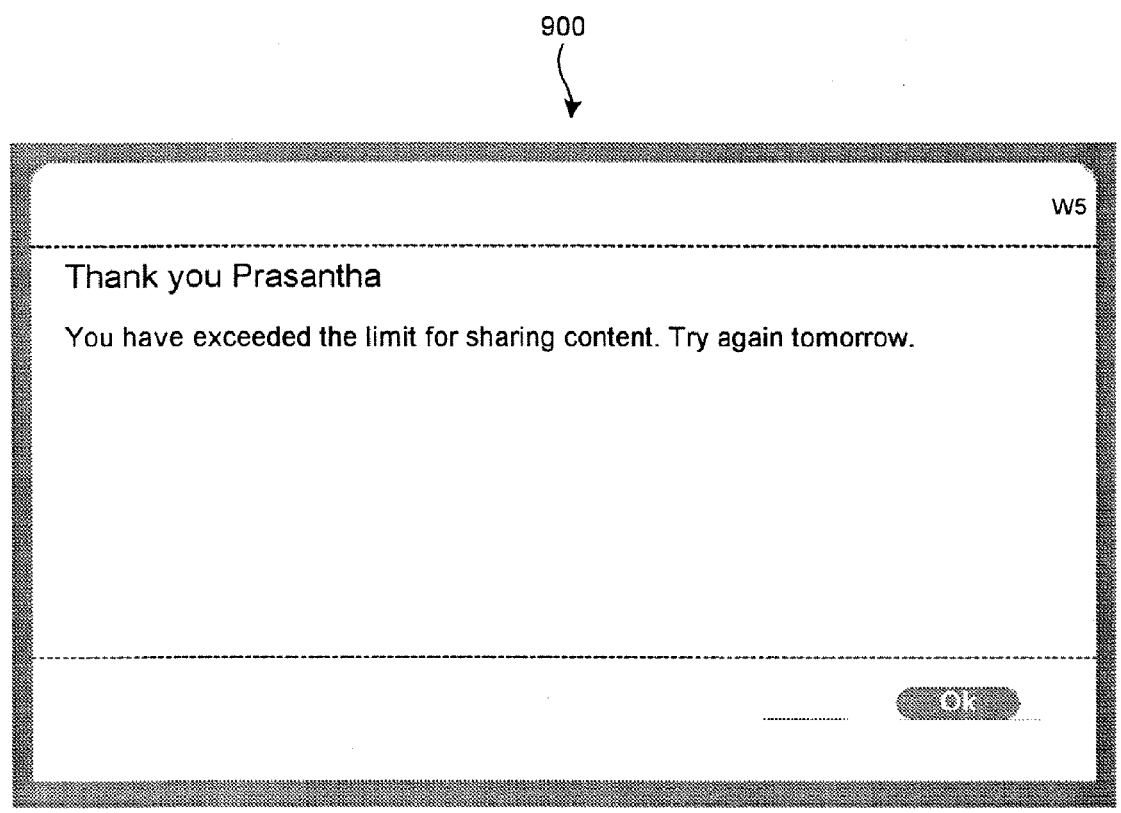
FIG. 9 is a display diagram showing screens from which a user of the personal computer content sender device of FIG. 1 can view spam control messages when the user has attempted to share content with more than three users at one time.

Referring to FIG. 9, in any number of situations, such as those described above with respect to FIGS. 4 and 5, a user may receive an error message 900 for attempting to send more than a threshold number of messages during a specified time period, even where multiple recipient information forms are used. In the embodiment illustrated in FIG. 9, the error message 900 is displayed on a web browser screen of a PC, indicating that a threshold for sending share content messages has been exceeded. While not shown, a similar error message screen may be displayed on a mobile device.

Figure 10:
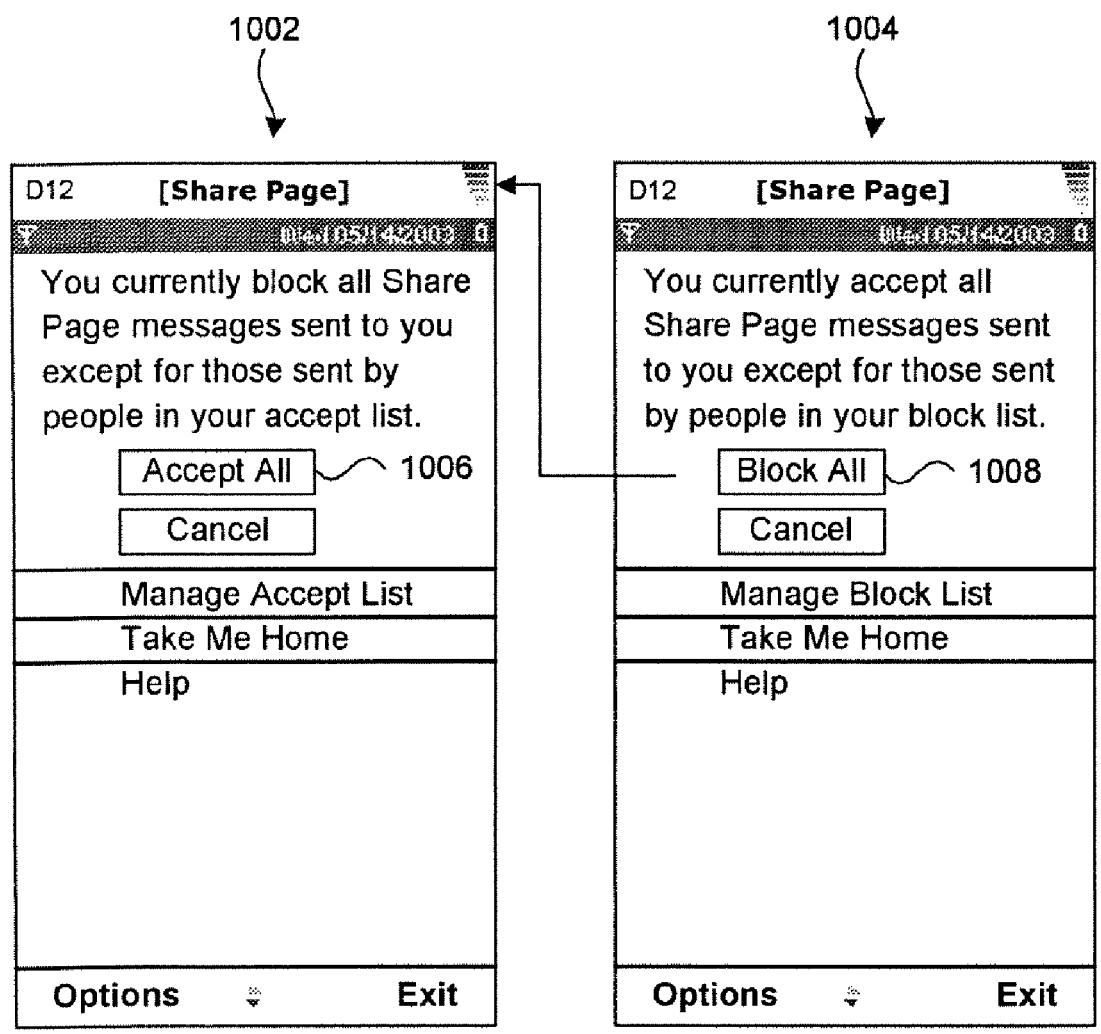
FIG. 10 is a display diagram showing screens from which the user of the recipient device may set global privacy settings.

Referring to FIG. 10, a user can set his or her global block message settings from a series of one or more privacy management screens (1002 and 1004). Screen 1002 shows that the user currently blocks share content messages and describes that, if the user would like to receive messages, he or she can select an accept option 1006. Screen 1004 shows that the user currently accepts share content messages. From this screen, if the user no longer wants to receive such messages, the user can select a block option 1008.

Figure 11:
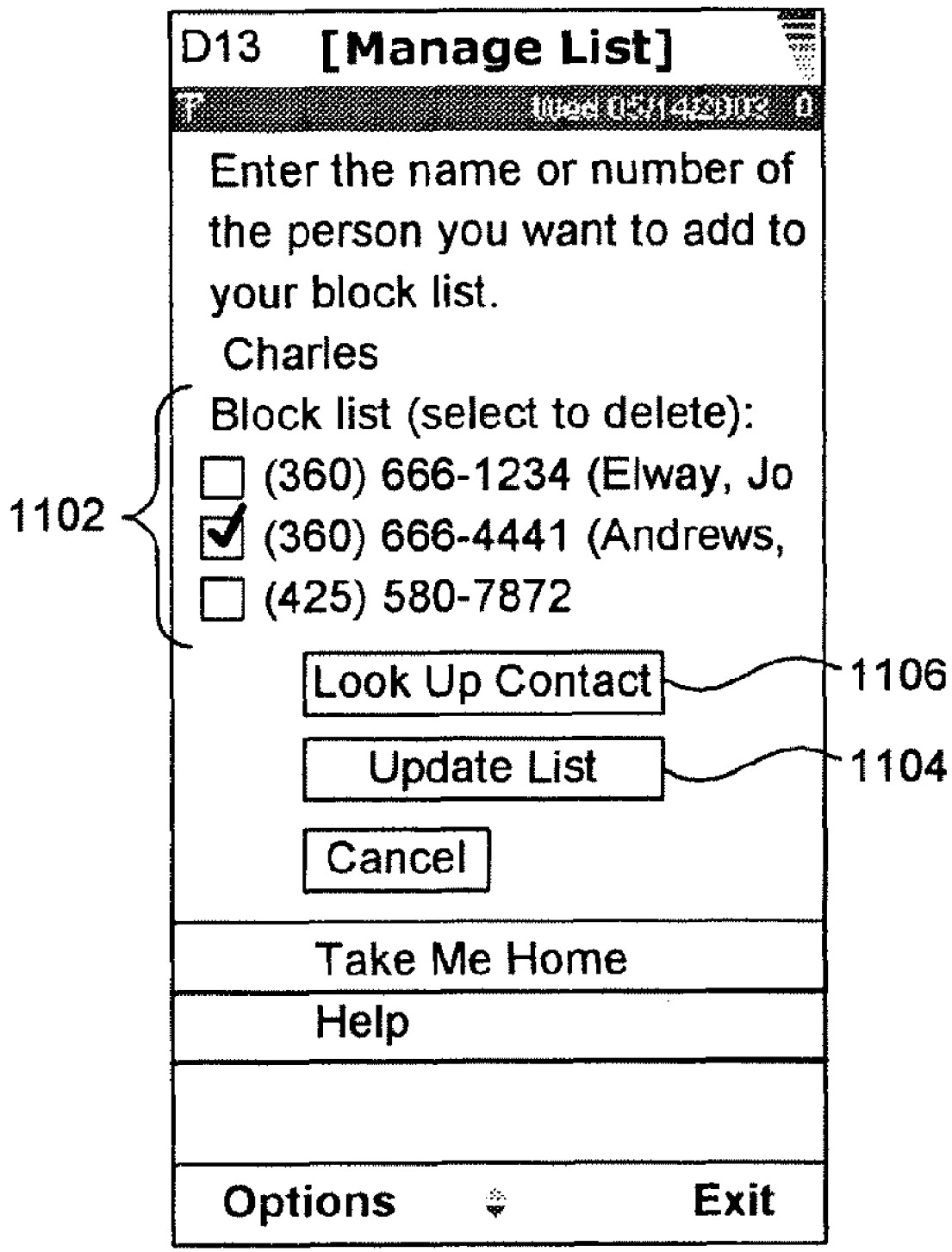
FIG. 11 is a display diagram showing screens from which the recipient may identify privacy settings, including a blocked list used when the global privacy settings of FIG. 10 are set to receive share content messages by default.

Referring to FIG. 11 when a user has instated global privacy management settings that allow the user to receive share content messages unless blocked, the privacy management settings allow the user to specify a list of blocked senders 1102 that the share content application may use for exceptions. In the illustrated embodiment, the user can go back and modify the blocked list at a later time by selecting an update list option 1104. In addition, the selection of blocked individuals may be facilitated via an address book application, such as the address book application 112 of the system of FIG. 1. Access to the address book application may involve the selection of a look up contact option 1106.

Figure 12:
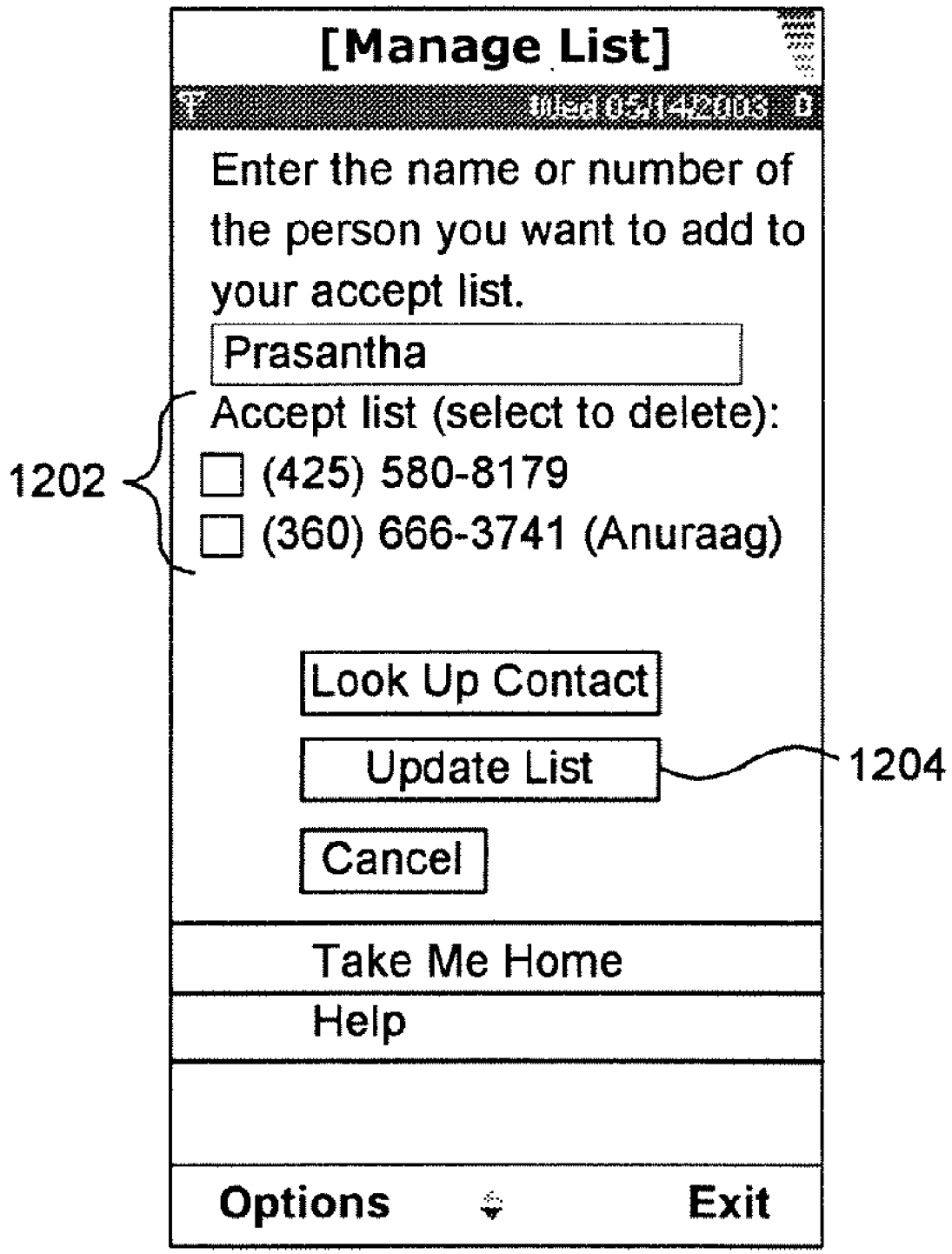
FIG. 12 is a display diagram showing screens from which the recipient may identify privacy settings, including an affirmative exceptions list when the global privacy settings of FIG. 10 are set to block share content messages by default.

Referring to FIG. 12, when a user has instated global privacy management settings that prevent the user from receiving certain share content messages, the privacy management settings allow the user to specify an accept list 1202 of allowed senders that the share content application may use for exceptions. In the illustrated embodiment, the user can go back and modify the blocked list at a later time via an update list option 1204. Access to the address book application may also be provided via a look up contact option.

VI. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps or employ systems having blocks in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or at different times. Where the context permits, words in the above Detailed Description using the singular or plural number may also include the plural or singular number, respectively, where the context permits.

The teachings of the invention provided herein can be applied to other systems, not necessarily only the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the content sharing system and spam control and privacy management techniques may vary considerably in their implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. In a telecommunications system having at least one network coupled among multiple mobile devices, wherein a content sharing system and a content provider are also coupled to the network, a method of limiting the sharing of content between a user and a recipient, wherein the content is shared using a share content message that is initiated by the user and that is to be received on a mobile device of the recipient, and wherein the share content message, when received, encourages the recipient to access the content using the mobile device, the method comprising:
   tracking a history of share content messages initiated by the user;
   in response to receiving a share content request from a device of the user, providing a recipient information form for display to the user, wherein the recipient information form includes a request for the user to designate one or more recipients to receive the share content message;
   receiving, over a network link associated with the network, user input information submitted by the user via the provided recipient information form, wherein the user input information identifies the one or more recipients; and
   determining whether to generate a share content message to send to the one or more recipients, wherein the determining is based on analyzing the received user input information and the history of share content requests initiated by the user to determine if a threshold for sharing content will be exceeded if one or more share content messages are generated as requested by the user.

2. The method of claim 1, wherein the threshold for sharing content is associated with a predetermined number of share content messages that can be generated on behalf of the user during a given time frame.

3. The method of claim 1, wherein the threshold for sharing content is exceeded if, within a specified time frame, the user requests to share the same content a second time by submitting input information via a second recipient information form.

4. The method of claim 1, wherein the content sharing system is associated with a wireless carrier and wherein the wireless carrier provides mobile service for the mobile devices of the one or more recipients.

5. The method of claim 1, wherein the content sharing system is associated with a wireless carrier and wherein the wireless carrier does not provide mobile service for the mobile devices of the one or more recipients.

6. The method of claim 1 further comprising providing access to an address book application coupled to the content sharing system, wherein the address book application facilitates the user's identification of the one or more recipients.

7. The method of claim 1, wherein the tracking a history of share content requests initiated by the user includes recording a submission number associated with a request to share content.

8. The method of claim 1, wherein the tracking a history of share content requests associated with the user includes recording a user identifier associated with a device of the user.

9. The method of claim 1, wherein the tracking a history of share content requests associated with the user includes recording a recipient identifier associated with a device of each of the one or more recipients with whom the user is requesting to share content.

10. The method of claim 1, wherein the recipient information form provided for display to the user includes a listing of a predetermined number of recipients with whom the user recently shared content.

11. The method of claim 1, further comprising generating a share content message to send to the one or more recipients, wherein the share content message is in the form of a WAP push message.

* * * * *